T. W. CHALENDER.
SAW SET.
APPLICATION FILED MAY 17, 1917.
1,268,681.
Patented June 4, 1918.
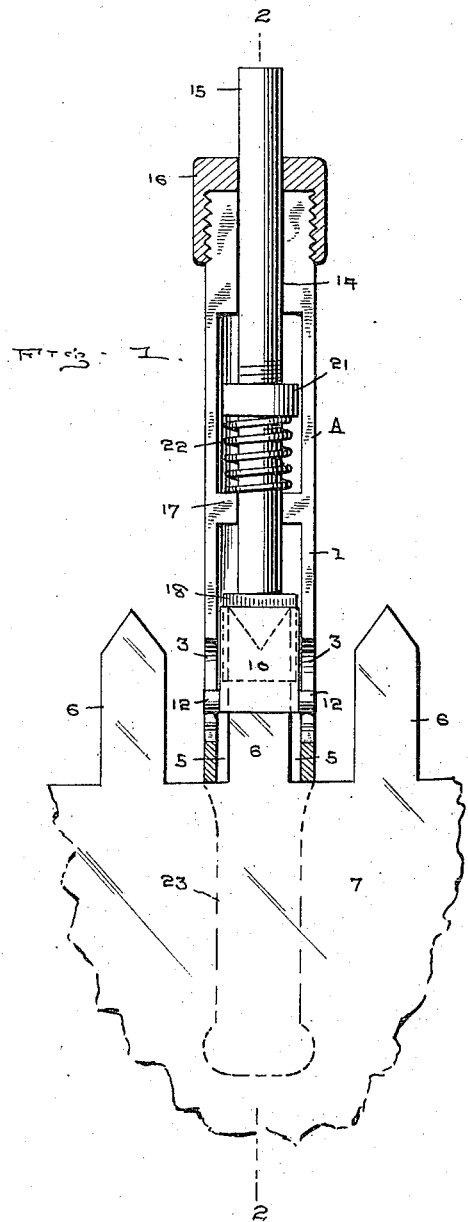
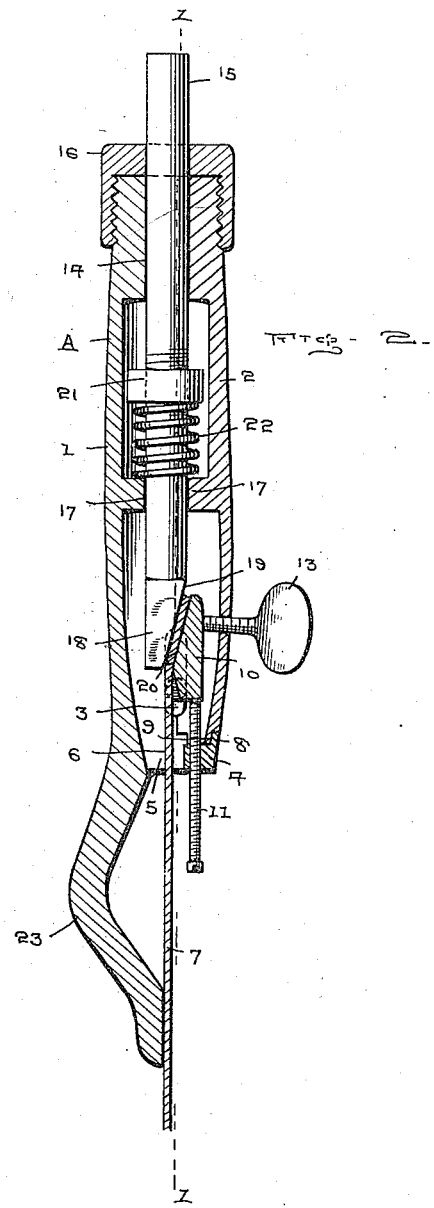
Inventor
T. W. Chalender
By
W. J. Fitzgerald & Co.
Attorneys

UNITED STATES PATENT OFFICE

THOMAS W. CHALENDER, OF GARWOOD, IDAHO.

SAW-SET.

1,268,681.

Specification of Letters Patent.

Patented June 4, 1918.

Application filed May 17, 1917. Serial No. 169,299.

*To all whom it may concern:*

Be it known that I, THOMAS W. CHALENDER, a citizen of the United States, residing at Garwood, in the county of Kootenai and State of Idaho, have invented certain new and useful Improvements in Saw-Sets; and I do hereby declare the following to be a full, clear, and exact description of the invention, such as will enable others skilled in the art to which it appertains to make and use the same.

This invention relates to a saw set and has for its primary object to provide a device whereby the teeth of a saw may be selectively set with the same degree of angular relation and accuracy and without the liability of breaking the cutting tips of the teeth.

Another object of the invention is to provide a saw set which embodies swaging means that can be adjusted and quickly and readily operated to set the cutting tip of a saw tooth to any desired degree of angular relation with respect to the body of the tooth.

Another object of the invention is to provide means for adjusting the swaging means so that the saw set can be used to set saw teeth of various lengths and sizes.

With these and other objects in view as will appear as the description proceeds, the invention comprises the various novel features of construction, combination and arrangement of parts as will be more fully described hereinafter and set forth with particularity in the appended claims.

Referring to the drawings,

Figure 1 is a vertical sectional view taken on the line 1—1 of Fig. 2, and

Fig. 2 is a vertical sectional view taken on the line 2—2 of Fig. 1.

Similar characters of reference are used to donate like parts throughout the following description and the accompanying drawings.

Referring more particularly to the drawings, the letter A represents the casing of my improved construction of saw set, and which consists of casing sections 1 and 2 each of which is curved outwardly intermediate its ends to fit the inside curvature of a person's hand so that the device can be readily grasped and comfortably held in operative position with the saw teeth. The opposite side edges of the casing sections 1 and 2 are cut away adjacent their lower ends and coöperate with each other to provide vertically disposed guide slots 3.

The lower end of the casing section 1 is formed to provide a collar 4 having a central opening 5 designed to selectively receive each of the saw teeth 6 of the saw 7, and this collar 4 has an upwardly extending flange 8 at its upper outer edge. The casing section 2 has its lower end cut away to provide a downwardly extending flange 9 which is positioned behind the flange 8 so as to hold and maintain the lower end of the casing section 2 in co-engagement with the casing section 1.

Arranged within the saw set casing is a swage block 10 which is adjustable vertically through the medium of a set screw 11 threaded through the collar 4 and bearing against the bottom of the swage block. This swage block 10 is provided on opposite sides at its bottom with trunnions 12 that project though the vertical slots 3 and serve to guide and pivot the swage block in its adjustment within the casing. A set screw 13 extends transversely through the casing section 2 and engages the rear side of the swage block 10 whereby upon rotation of the screw, the swage block may be adjusted transversely within the casing upon its trunnions 12. By the provision of the set screw 11, the swage block may be adjusted vertically to properly correspond with the length of the tooth or teeth to be set, while by the provision of the set screw 13 the swage block may be adjusted transversely to vary the angle of the cutting tip of the saw tooth with respect to the tooth body, as desired.

The upper ends of the sections 1 and 2 are solid and are each recessed in their co-engaging faces as indicated by the numeral 14 to slidably receive the upper end of a plunger rod 15, and each of these casing sections is externally threaded to receive a clamping nut 16, said nut being provided with a central aperture to receive the plunger rod.

The casing sections 1 and 2 are provided with transversely extending shoulders 17 which have coöperating recesses formed in their co-engaging faces to receive and form a guide for the lower end of the plunger rod 15.

The lower end of the plunger rod 15 is provided with a swage head 18 which has its inner active face beveled as indicated by the numeral 19 and is designed to co-act with the inner beveled face 20 of the adjustable swage block 10 to set the cutting tip of the saw tooth at the desired angle.

In order that the plunger rod may be immediately returned to its normal position after an impact has been imparted to its upper end, a collar 21 is threaded or otherwise mounted upon it and arranged between the collar 21 and the shoulders 17 is an expansible spring 22.

In the operation of the saw set, it is positioned over a saw tooth until the collar 4 rests upon the upper edge of the saw blade, as clearly shown in the drawings, and until the lower end of the angular bracket arm 23 carried by the lower end of the casing section 1 bears against the vertical side of the saw blade so as to brace and hold the saw set in proper position. This having been done the swage block 10 is adjusted vertically to correspond with the height of the tooth to be set, after which the set screw 13 is adjusted to give the cutting tip of the tooth the proper angular relation with respect to the tooth body. The saw set casing is now grasped in one hand and an impact delivered to the upper end of the plunger rod by a hammer, or other suitable instrument, which will drive the swage head 18 down upon the cutting tip of the saw tooth and force it against the swage block 10, thus setting the cutting tip of the tooth as desired. Immediately after delivering the impact to the plunger, the expansion spring 22 will move the plunger rod upwardly to its normal position and at the same time carrying the swage head upwardly out of engagement with the saw tooth cutting tip so that the saw set can be readily removed from over the tooth just set and subsequently positioned over the next tooth to be set.

By the particular construction of the saw set, it will be apparent that the two halves of the casing may be quickly and readily separated to allow of access to the plunger rod and the swaging means arranged within the casing.

From the foregoing description, the advantages of construction and the method of operation will be readily apparent to those skilled in the art to which this invention relates, and while I have described the preferred embodiment of the invention, I desire to have it understood that such changes in construction and arrangement of parts may be made when desired as are within the scope of the appended claims.

I claim,

1. A saw set comprising a casing, a swaging block mounted within said casing, means bearing against said swage block for adjusting it vertically, means for adjusting said swage block transversely, a plunger rod slidably mounted within the casing and projecting from one end thereof, a swage head carried by the lower end of said plunger rod, and resilient means to return said plunger rod to its normal position immediately after an impact has been delivered to said plunger rod.

2. A saw set comprising a casing, a swage block pivotally mounted within said casing, means for adjusting said swage block vertically, means for adjusting said swage block transversely, a plunger rod slidably mounted within the casing, and projecting from one end thereof, a swage head carried by the lower end of the plunger rod, and resilient means to move said plunger rod and said swage head upwardly immediately after an impact has been delivered to said plunger rod.

3. A saw set embodying a casing consisting of two sections, means for connecting said sections together, a bracket arm extending downwardly from one of said casing sections and adapted to bear against one side of the saw to hold the saw set in operative position, swaging means arranged within said casing, and means for operating said swaging means.

4. A saw set comprising a casing consisting of separable sections, means for detachably connecting the ends of said sections together, and swaging means operatively mounted and housed within said casing.

In testimony whereof I have signed my name to this specification in the presence of two subscribing witnesses.

THOMAS W. CHALENDER.

Witnesses:
 CARL NILSON,
 BEN STEELE.